United States Patent Office 2,796,420
Patented June 18, 1957

2,796,420
SYNTHESIS OF ALKALOIDS

Frank L. Weisenborn, New Brunswick, N. J., assignor to Olin Mathieson Chemical Corporation, New York, N. Y., a corporation of Virginia No Drawing. Application April 5, 1956,
Serial No. 576,248

12 Claims. (Cl. 260—286)

This invention relates to the synthesis of new alkaloids and, more particularly, to the preparation of 16-carboxy-18-hydroxy-$\Delta^{15(20)}$-yohimbene and esters thereof.

The new yohimbene derivatives of this invention may be represented by the general formula

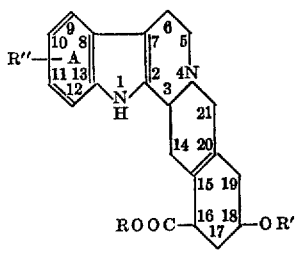

wherein R is hydrogen or a hydrocarbon radical of less than ten carbon atoms (e. g., lower alkyl, lower aralkyl or aryl), and preferably is methyl; R' is hydrogen or an acyl radical of less than ten carbon atoms (e. g., lower alkanoyl, lower aralkanoyl, aroyl, lower alkane sulfonyl, lower aralkane sulfonyl, and aryl sulfonyl), and preferably is methane sulfonyl; and R" is hydrogen or lower alkoxy (e. g., 11-methoxy). Among the final compounds within the scope of this invention may be mentioned 16-carboxy-18-hydroxy-$\Delta^{15(20)}$-yohimbene, the 16-lower alkyl esters thereof (e. g., 16-carbomethoxy-18-hydroxy-$\Delta^{15(20)}$-yohimbene), the 16-lower aralkyl ester thereof (e. g., the benzyl and phenethyl esters), the 16-aryl esters thereof (e. g., the phenyl and tolyl esters), the 18-lower alkanoic acid esters thereof (e. g., 16-carboxy-18-acetoxy-$\Delta^{15(20)}$-yohimbene), the 18-lower aralkanoic acid esters thereof (e. g., the phenacetic and $\beta$-phenylpropionic acid esters), the 18-aroic acid esters thereof (e. g., the benzoic and trimethoxybenzoic acid esters), the 18-lower alkanesulfonic acid esters thereof (e. g., 16-carboxy-18-mesyloxy-$\Delta^{15(20)}$-yohimbene), the 18-lower aralkane sulfonic acid esters thereof, the 18-aromatic sulfonic acid esters thereof (e. g., the p-tosyl ester), and the 16,18-diesters thereof (e. g., 16-carbomethoxy-18-mesyloxy-$\Delta^{15(20)}$-yohimbene).

These new yohimbene derivatives are pharmacologically active alkaloids which possess adrenolytic activity. Thus, the compounds of this invention can be used in lieu of known adrenolytic compounds such as phentolamine, 2-N[p' - tolyl - N - (m' - hydroxyphenyl) - aminomethyl]-imidazoline, in the treatment of peripheral vascular diseases, or the diagnosis of pheochromocytoma, for which purpose they are administered orally or parenterally in the same manner as phentolamine.

The new yohimbene derivatives of this invention are prepared by the process of this invention from the methyl ester of 2-carbomethoxy-3,4-dimethoxy-phenylacetic acid. This process can be represented schematically by the following equations:

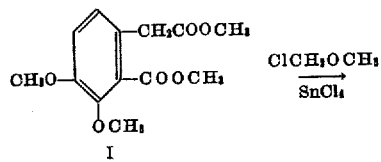

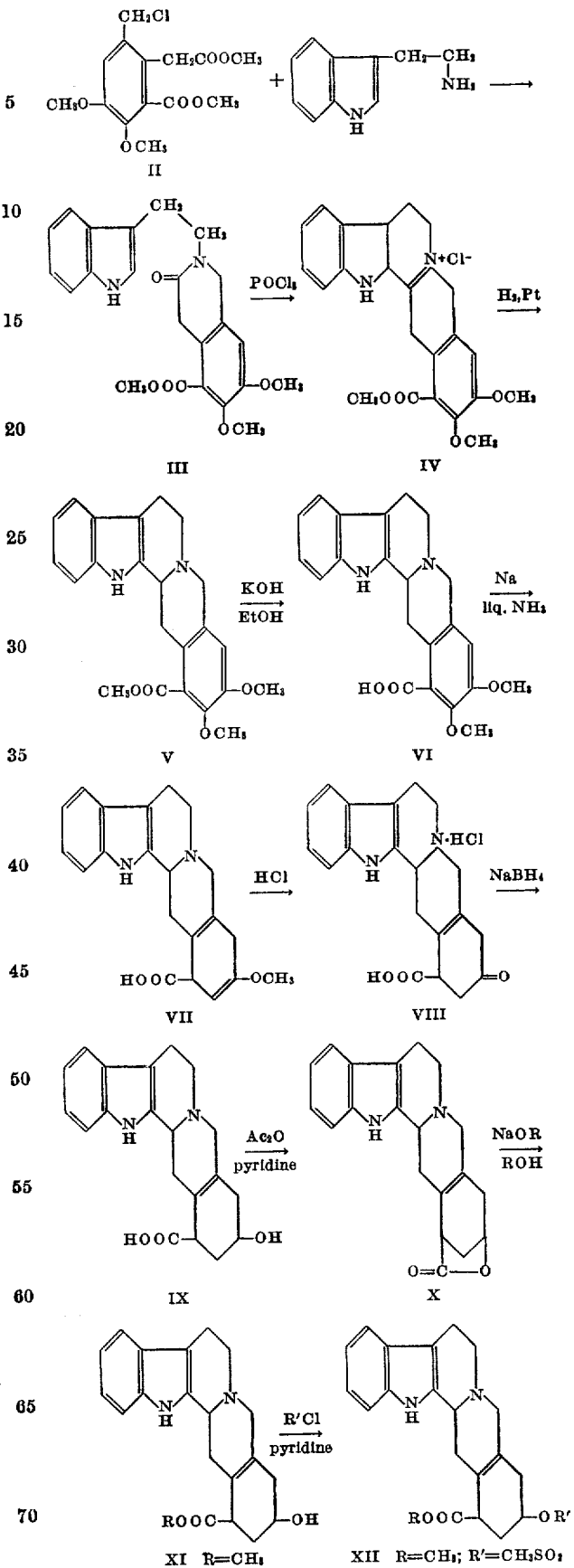

The following examples illustrate the process of this invention (all temperatures being in centigrade):

EXAMPLE 1

*Preparation of methyl 2-carbomethoxy-3,4-dimethoxy-6-chloromethyl-phenylacetate (II)*

3.46 g. of methyl 2-carbomethoxy-3,4-dimethoxyphenylacetate (I) prepared by the method disclosed by Schöpf et al., Ann., 554, 77 (1940) is dissolved in 3.5 ml. of chloromethyl ether and the solution is cooled in an ice bath. 0.7 ml. of stannic chloride is added dropwise with stirring over a 30 minute period. After the addition the reaction mixture is allowed to rise gradually to room temperature while the stirring is continued for 1½ hours. The solution is then poured onto cracked ice and extracted two times with 100 ml. portions of ether. The combined extracts are washed with saturated sodium chloride solution, dried over sodium sulfate and concentrated in vacuo. [It is important at this stage not to let the temperature rise above 40°. Crystallization of the product is best accomplished by not removing all the ether during concentration. Thus when the volume is small but the solution still perfectly clear the ether solution is boiled down in a smaller flask on the steam bath until a faint turbidity is noted.] The concentrate is then left in an ice-box overnight and the colorless needles which precipitate are filtered off and washed with a small volume of ether. The chloromethylation product II so obtained weighs about 3.21 g., M. P. 79–81° (78%).

EXAMPLE 2

*Preparation of N-[2-(3-indolyl)-ethyl]-3-oxo-5-carbomethoxy-6,7-dimethoxy-1,2,3,4-tetrahydroisoquinoline (III)*

A solution of 2.87 g. tryptamine in 20 ml. of tetrahydrofuran is added to a solution of 2.87 g. of the chloroester II in 8 ml. of tetrahydrofuran. Precipitation of tryptamine hydrochloride begins almost immediately, and after standing 18 hours the hydrochloride (about 1.512 g.) is filtered off and washed with a little tetrahydrofuran. The filtrate is concentrated under vacuum to remove most of the solvent. Methanol is added and the solution is boiled down on the steam bath until precipitation begins. The mixture is then allowed to stand in an ice-box overnight and the very light yellow prisms about 3.13 g. (85%), M. P. 170–171°, are filtered off. A second crop of 293 mg. of III is obtained by concentration of the mother liquors, the total yield is about 93%.

EXAMPLE 3

*Preparation of the unsaturated base IV*

A mixture of 7.78 g. of the lactam III and 44 ml. of redistilled phosphorus oxychloride are heated for 30 minutes under reflux in a nitrogen atmosphere at a bath temperature of 105°. The lactam dissolves quickly on heating to give an orange-red solution from which an orange precipitate almost immediately appears. The reaction mixture is cooled to room temperature diluted with 100 ml. of ether and the resulting yellow precipitate filtered off, washed with ether and dried to give about 9.62 g. (91%) of the dichlorophosphate salt IV. The dichlorophosphate salt is dissolved in 750 ml. of methanol and the solution concentrated until crystals appear. The hydrochloride IV is thus obtained as orange needles about 7.3 g. (90%), M. P. 245–247°.

EXAMPLE 4

*Preparation of the saturated base V*

4.023 g. of the hydrochloride IV is dissolved in 620 ml. of hot methanol, cooled and hydrogenated at atmospheric pressure over 445 mg. of platinum oxide. Hydrogenation proceeds very rapidly and after 20 minutes it is essentially completed. After 30 minutes the reaction is stopped, the catalyst filtered off and the solution taken to dryness under vacuum. The yellow residue is shaken with 300 ml. of chloroform and 200 ml. of 5% sodium carbonate until all the solid dissolved. The chloroform extract is washed with saturated sodium chloride solution, dried over sodium sulfate and concentrated in vacuo. The residue is taken up in methanol and the orange-red solution concentrated on the steam bath until crystallization begins. After cooling in an ice-box overnight the colorless needles of V are filtered off and washed with a little methanol to remove pigment. The ester V weighs about 3.602 g. (97%), melts initially at 115–130°, resolidifies and melts again at 210.5–212°.

EXAMPLE 5

*Hydrolysate of the dimethoxy ester VI*

5.50 g. of the dimethoxy ester V is heated under reflux in a solution of 138 ml. of ethanol and 92 ml. of 35% aqueous potassium hydroxide for 3½ hours. The reaction mixture is then diluted with 85 ml. of water and the ethanol removed under vacuum. When most of the alcohol is removed, the potassium salt of the product VI begins to precipitate. The majority of potassium hydroxide remaining is neutralized with 75 ml. of 33% acetic acid and after cooling, the precipitate is filtered off, washed with a small amount of cold water and dried. The nearly colorless potassium salt of VI is then heated under reflux with 100 ml. of ethyl acetate to remove any unhydrolyzed ester. The dried potassium salt of VI weighs about 5.87 g., M. P. 264–266°.

The free acid VI is obtained by dissolving the salt in water and acidifying to pH 6 with acetic acid, M. P. 266–270°.

The hydrochloride salt of VI has an M. P. 255–256°.

EXAMPLE 6

*Birch reduction of VI to the enol-ether VII*

4.11 g. of the potassium salt of VI is suspended in 300 ml. of ammonia containing 10 ml. of isopropanol and reduced by the addition of 2.06 g. of sodium in small pieces over a 15 minute period. Stirring is continued for 30 minutes; then 10 g. of ammonium chloride is added and the ammonia solution poured into a beaker and allowed to evaporate. The residue is taken up in 80 ml. of water and with vigorous stirring is neutralized with glacial acetic acid to pH 6. The light tan precipitate is centrifuged off, washed with water and dried in vacuum at 100°. The weight of enol ether VII is about 3.08 g. (88%), M. P. 225–227°.

EXAMPLE 7

*Hydrolysis of enol-ether VII to keto-acid VIII*

1.145 g. of enol-ether VII is dissolved in a mixture of 11 ml. of 1 N hydrochloric acid and 4 ml. of methanol. The solution is heated for a few minutes on the steam bath, and on cooling the keto-acid VIII crystallizes in almost colorless needles, about 772 mg. (63.5%), M. P. 233–238°.

EXAMPLE 8

*Reduction of the keto-acid VIII to 16-carboxy-18-hydroxy-$\Delta^{15(20)}$-yohimbene (IX)*

1.00 g. of the keto-acid hydrochloride VIII is added slowly to a solution of 1.5 g. of sodium borohydride in 50 ml. of methanol containing 5 ml. of 1 N methanolic potassium hydroxide. After standing for two hours, the methanol is removed under vacuum, the residue dissolved in 40 ml. of water and acidified to pH 6 with glacial acetic acid. A precipitate rapidly forms and after standing overnight in the refrigerator, it is centrifuged off, washed with water and dried. The resulting 16-carboxy-18-hydroxy-$\Delta^{15(20)}$-yohimbene (IX) weighs about 860 ml., M. P. 226–229°.

EXAMPLE 9

*Preparation of the lactone X from 16-carboxy-18-hydroxy-$\Delta^{15(20)}$-yohimbene (IX)*

741 mg. of 16-carboxy-18-hydroxy-$\Delta^{15(20)}$-yohimbene is dissolved in a mixture of 50 ml. of pyridine and 10 ml. of acetic acid. The resulting yellow solution is allowed to stand overnight and then taken to dryness in vacuum. The residue is dissolved in chloroform and extracted with 5% sodium bicarbonate solution. The chloroform layer is washed with water and saturated sodium chloride solution, dried over sodium sulfate and concentrated. The amorphous residue crystallizes on addition of methanol. Recrystallization from methanol gives about 520 mg. (74%) of the lactone X, M. P. 298–299° (methanolate).

EXAMPLE 10

*Preparation of 16-carbomethoxy-18-hydroxy-$\Delta^{15(20)}$-yohimbene (XI) from the lactone X*

308 mg. of the lactone X is dissolved in a solution of sodium methoxide in methanol (prepared by dissolving 200 mg. of sodium in 75 ml. of methanol). The mixture is heated under reflux for 15 minutes to dissolve all of the lactone, allowed to stand overnight and then refluxed for 1.5 hours more. The resulting solution is acidified with acetic acid and concentrated to dryness. The residue is distributed between chloroform and 5% sodium bicarbonate. The chloroform extracts are washed with water, saturated sodium chloride solution, dried over sodium sulfate and taken to dryness. The residue is recrystallized from methylene chloride-benzene to give small colorless needles, about 256.4 mg. (76%), M. P. 212–214°.

Similarly, by substituting sodium ethoxide in ethanol for the sodium methoxide in methanol in the procedure of Example 10, 16-carbethoxy-18-hydroxy-$\Delta^{15(20)}$-yohimbene is formed. Analogously, if other alkali metal alcoholates are substituted for the sodium methoxide and the corresponding alcohols are substituted for the methanol, the respective esters are produced. Thus, potassium benzoxide in benzyl alcohol yields the 16-carbobenzoxy derivative, sodium phenoxide in phenol yields the 16-carbophenoxy derivative, and sodium toloxide in cresol yields the 16-carbotoloxy derivative.

EXAMPLE 11

*Preparation of 16 - carbomethoxy - 18-mesyloxy-$\Delta^{15(20)}$-yohimbene (XII) from 16-carbomethoxy-18-hydroxy-$\Delta^{15(20)}$-yohimbene (XI)*

154 mg. of 15-carbomethoxy-18-hydroxy-$\Delta^{15(20)}$-yohimbene is dissolved in 2 ml. of dry pyridine, cooled in an ice-salt bath and treated with 0.1 ml. of methanesulfonyl chloride in 1.0 ml. of pyridine. The resulting yellow solution is allowed to stand overnight at room temperature then diluted with 25 ml. of 5% sodium bicarbonate solution and extracted with chloroform. The chloroform extracts are washed with water and saturated sodium chloride solution, dried over sodium sulfate and concentrated. The residue is taken up in a small amount of methanol from which the mesylate readily crystallizes. The crystalline ester so obtained weighs about 98.1 mg. (53%), M. P. 152–156°.

Similarly, by substituting acetic anhydride or acetyl chloride for the methanesulfonyl chloride in the procedure of Example 11, 16-carbomethoxy-18-acetoxy-$\Delta^{15(20)}$-yohimbene is formed. Analogously, if other acyl chlorides, such as other lower alkanoyl chlorides (e. g. propionyl chloride), other lower alkane sulfonyl chlorides (e. g. ethanesulfonyl chloride), lower aralkanoyl chlorides (e. g. phenylacetyl chloride or β-phenylpropionyl chloride), aroyl chlorides (e. g. benzoyl chloride or trimethoxybenzoyl chloride), or aromatic sulfonyl chlorides (e. g. tosyl chloride) are substituted for the methanesulfonyl chloride in the procedure of Example 11, the respective 18-acyloxy derivatives are produced. Furthermore, by substituting other 16-carboxy derivatives for the 16-carbomethoxy compound in the procedure of Example 11, the respective yohimbene derivative having the desired 16-substituent is prepared.

Furthermore, if a substituted tryptamine, such as 6-methoxytryptamine, is substituted for the unsubstituted tryptamine in the procedure of Example 2, the correspondingly substituted derivatives are obtained in each of the procedures of the following examples, and thus a method is afforded for preparing 16-carboxy-18-hydroxy-$\Delta^{15(20)}$-yohimbene derivatives substituted in the A ring with a lower alkoxy radical.

The invention may be variously otherwise embodied within the scope of the appended claims.

I claim:

1. A compound of the general formula

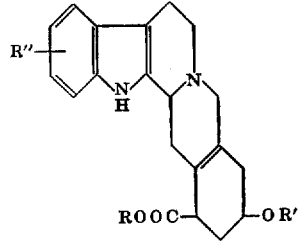

wherein R is selected from the group consisting of hydrogen and hydrocarbon of less than ten carbon atoms wherein the acyl radical is selected from the group consisting of lower alkanoyl, lower aralkanoyl, aroyl, trimethoxyaroyl, lower alkane sulfonyl, lower aralkane sulfonyl and aryl sulfonyl, R' is selected from the group consisting of hydrogen and acyl of less than ten carbon atoms, and R" is selected from the group consisting of hydrogen and lower alkoxy.

2. 16-carboxy-18-hydroxy-$\Delta^{15(20)}$-yohimbene.
3. 16-carbomethoxy-18-hydroxy-$\Delta^{15(20)}$-yohimbene.
4. 16-carbomethoxy-18-mesyloxy-$\Delta^{15(20)}$-yohimbene.
5. A compound of the formula

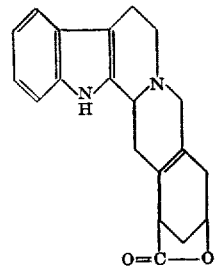

6. A compound of the formula

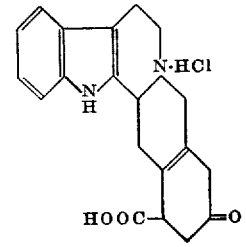

7. A compound of the formula

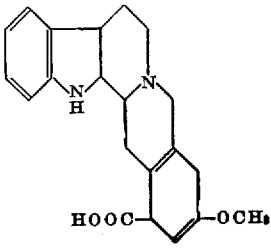

8. A compound of the formula
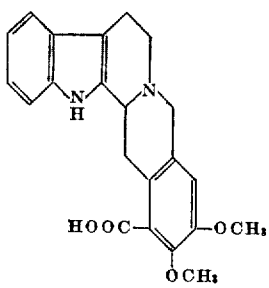
9. A compound of the formula
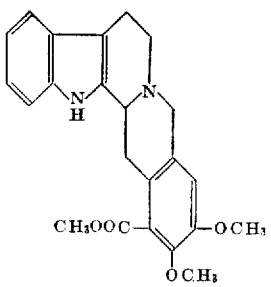
10. A compound of the formula
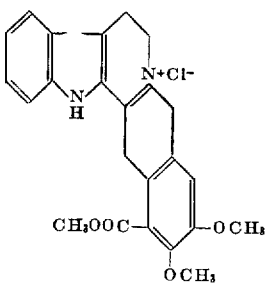
11. A compound of the formula
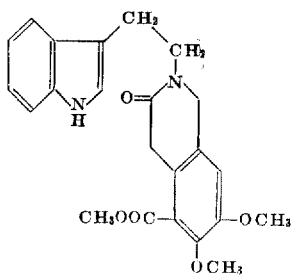
12. Methyl 2 - carbomethoxy-3,4 - dimethoxy-6-chloromethyl phenylacetate.
No references cited.

U. S. DEPARTMENT OF COMMECE

PATENT OFFICE

CERTIFICATE OF CORRECTION

Patent No. 2,796,420            June 18, 1957

Frank L. Weisenborn

It is hereby certified that error appears in the printed specification of the above numbered patent requiring correction and that the said Letters Patent should read as corrected below.

Column 6, line 29, beginning with "wherein R" strike out all to and including "lower alkoxy" in line 37, and insert instead the following:

--wherein R is selected from the group consisting of hydrogen and hydrocarbon of less than ten carbon atoms, R' is selected from the group consisting of hydrogen and acyl of less than ten carbon atoms wherein the acyl radical is selected from the group consisting of lower alkanoyl, lower aralkanoyl, aroyl, trimethoxyaroyl, lower alkan sulfonyl, lower aralkane sulfonyl and aryl sulfonyl, and R" is selected from the group consisting of hydrogen and lower alkoxy--.

Signed and sealed this 11th day of March 1958.

(SEAL)
Attest:

KARL H. AXLINE

Attesting Officer

ROBERT C. WATSON
Commissioner of Patents